United States Patent
Glazebrook et al.

(10) Patent No.: US 10,065,266 B2
(45) Date of Patent: Sep. 4, 2018

(54) STRUCTURAL ELEMENTS OBTAINED BY LINEAR FRICTION WELDING

(71) Applicant: CONSTELLIUM ISSOIRE, Issoire (FR)

(72) Inventors: Christopher John Glazebrook, Oakham (GB); Manuel Grenet, Villedieu les Poeeles (FR); Julien Laye, Voreppe (FR)

(73) Assignee: Constellium Issoire, Issoire (FR)

( * ) Notice: Subject to any disclaimer, the term of this patent is extended or adjusted under 35 U.S.C. 154(b) by 0 days.

(21) Appl. No.: 14/392,149

(22) PCT Filed: Jun. 24, 2014

(86) PCT No.: PCT/IB2014/001817
§ 371 (c)(1),
(2) Date: Jul. 6, 2016

(87) PCT Pub. No.: WO2014/207564
PCT Pub. Date: Dec. 31, 2014

(65) Prior Publication Data
US 2017/0050264 A1 Feb. 23, 2017

(51) Int. Cl.
*B23K 20/12* (2006.01)
*B23K 20/233* (2006.01)
*B23K 103/10* (2006.01)
*B23K 101/00* (2006.01)

(52) U.S. Cl.
CPC ...... *B23K 20/2336* (2013.01); *B23K 20/1205* (2013.01); *B23K 2201/006* (2013.01); *B23K 2203/10* (2013.01)

(58) Field of Classification Search
CPC ............ B23K 20/2336; B23K 20/1205; B23K 2201/006; B23K 2201/001; B23K 2203/10; B23K 1/06; B23K 20/10–20/106
USPC ............ 228/112.1–114.5, 2.1–2.3, 1.1, 110.1
See application file for complete search history.

(56) References Cited

U.S. PATENT DOCUMENTS

| | | | | |
|---|---|---|---|---|
| 2,797,396 | A * | 6/1957 | Granfield | H01F 27/245 336/217 |
| 2,946,119 | A * | 7/1960 | Jones | B22F 7/062 228/1.1 |
| 3,499,216 | A * | 3/1970 | Vadim | H01F 41/0206 29/416 |

(Continued)

FOREIGN PATENT DOCUMENTS

| | | | | |
|---|---|---|---|---|
| CA | 2916525 A1 * | 12/2014 | | B23K 20/1205 |
| CN | 102528271 A * | 7/2012 | | |

(Continued)

OTHER PUBLICATIONS

International Search Report from corresponding PCT/IB2014/001817, dated Jan. 23, 2015.

*Primary Examiner* — Kiley Stoner
(74) *Attorney, Agent, or Firm* — McBee Moore Woodward & Vanik IP, LLC; Susan E. Shaw McBee; David Vanik (57) ABSTRACT

The invention concerns a method for forming by welding along a flat surface an article. The method according to the invention is particularly useful to improve strength and elongation of welded joints obtained by linear friction welding. Structural articles of aircrafts obtained with the method of the invention are advantageous, in particular aircraft structural members.

12 Claims, 7 Drawing Sheets

(56) References Cited

U.S. PATENT DOCUMENTS

| | | | | |
|---|---|---|---|---|
| 3,973,921 A | * | 8/1976 | Ward | B23K 20/2336 220/269 |
| 4,594,020 A | * | 6/1986 | Hughes | E21B 17/00 403/271 |
| 4,732,312 A | * | 3/1988 | Kennedy | B23K 20/24 148/535 |
| 5,226,580 A | * | 7/1993 | Hartle | B23K 20/129 228/113 |
| 5,342,496 A | * | 8/1994 | Stellrecht | C23C 14/3407 204/298.12 |
| 5,942,314 A | * | 8/1999 | Fisher | B23K 20/10 228/1.1 |
| 6,391,129 B1 | * | 5/2002 | Hurd | C22C 21/00 148/690 |
| 6,717,100 B2 | * | 4/2004 | Ruben | B23K 26/22 219/121.63 |
| 8,397,928 B2 | * | 3/2013 | Lefort | B27H 3/04 217/72 |
| 8,640,320 B2 | * | 2/2014 | Carsley | B21D 39/023 228/155 |
| 8,852,365 B2 | * | 10/2014 | Sankaran | C22C 21/06 148/551 |
| 2003/0143074 A1 | * | 7/2003 | Tsukamoto | B23K 11/02 416/96 R |
| 2003/0168494 A1 | | 9/2003 | Halley et al. | |
| 2004/0056075 A1 | * | 3/2004 | Gheorghe | B23K 20/122 228/199 |
| 2005/0127140 A1 | * | 6/2005 | Slattery | B23K 20/12 228/112.1 |
| 2006/0054252 A1 | * | 3/2006 | Sankaran | B23K 20/1205 148/535 |
| 2007/0084905 A1 | | 4/2007 | Slattery et al. | |
| 2007/0138239 A1 | * | 6/2007 | Kumagai | B23K 20/1235 228/227 |
| 2008/0145266 A1 | * | 6/2008 | Chen | B23K 35/286 420/532 |
| 2009/0314823 A1 | * | 12/2009 | Bray | B23K 20/1205 228/112.1 |
| 2010/0040900 A1 | * | 2/2010 | Sumi | B23K 20/121 428/586 |
| 2010/0092789 A1 | * | 4/2010 | Heck | B32B 15/14 428/457 |
| 2011/0236718 A1 | * | 9/2011 | Fukuda | B23K 31/00 428/654 |
| 2013/0255619 A1 | * | 10/2013 | Mizuno | B23K 11/093 123/193.5 |
| 2013/0323531 A1 | * | 12/2013 | Nakagawa | B23K 20/021 428/648 |
| 2015/0222027 A1 | * | 8/2015 | Dupuis | B23K 20/129 439/805 |
| 2016/0146024 A1 | * | 5/2016 | Morris | F01D 5/3061 416/96 R |
| 2017/0022827 A1 | * | 1/2017 | Waldman | F01D 5/3061 |

FOREIGN PATENT DOCUMENTS

| | | | | |
|---|---|---|---|---|
| CN | 102534446 A | * | 7/2012 | |
| GB | 1059911 A | * | 2/1967 | B23K 9/0026 |
| WO | 2013058086 A1 | | 4/2013 | |

* cited by examiner

STRUCTURAL ELEMENTS OBTAINED BY LINEAR FRICTION WELDING

CROSS REFERENCE TO RELATED APPLICATIONS

This application is a § 371 National Stage Application of PCT/IB2014/001817, filed 24 Jun. 2014, which claims priority to EP 13354021.1, filed 26 Jun. 2013.

BACKGROUND

Field of the Invention

The invention concerns the welding of metal members according to the linear friction welding process. More precisely, it concerns welding together of two members comprising a wrought aluminium member having elongated grains.

Description of Related Art

Linear friction welding (LFW) is a welding process which involves the rubbing under pressure of one component across the face of another in a reciprocated motion. The reciprocated motion generates frictional heat which softens the material at the interface, and combined with the normal force, pushes this initial interface material out as flash. This process continues until sufficient material (usually a few millimeters) has "burned-off" and has been expelled as flash, whereupon the oscillation ceases and the two members are rapidly brought into alignment and a final "forge force" is maintained to consolidate the joint. Machining or grinding can subsequently remove flash produced during the LFW process. This process has recently attracted interest to assemble aluminium alloys.

Patent application U.S. 2003/0168494 describes a method of constructing a preform for use in forming a machined structural assembly wherein members are friction welded.

Patent application U.S. 2007/0084905 describes a method of making a tailored blank using friction welding wherein structural members are disposed with oblique angles.

As recognized in patent application U.S. 2006/054252 one drawback of LFW is a significant drop in ultimate tensile strength and elongation compared to the parent metal. The loss of ductility can in some instance make impractical or even impossible to use the LFW assembled members. It has been proposed to use further thermal treatments in order to recover the strength of aluminum alloys lost during the LFW process.

It should be noted that for a welding assembly, elongation is at least in part an indication of how localized within the welding zone the strain is. Mechanical properties are affected in the welding zone, when elongation is improved it can mean that the welding zone is smaller.

Depending on the size and the shape of the structural assembly it may not be possible to realize a post-welding heat treatment; the structural assembly in certain cases has to be used as welded and further machined. Even when a post-weld thermal treatment is realized it would be useful to further improve the mechanical properties of the welded joint.

The problem solved by the present invention is to improve the mechanical properties of the welded joint obtained by linear friction welding. In particular, it would be advantageous to improve elongation of the welded assembly which as explained relates to reducing the extension of the zone affected by welding. It is also needed to improve the balance between strength and fatigue properties of the welded assembly.

SUMMARY

An object of the present invention is a method for forming by welding along a flat surface an article comprising at least a first metallic member (10) in the form of an aluminium alloy wrought product having elongated grains in a longitudinal direction (L10), with an anisotropy index in a longitudinal oriented surface of at least 4 according to ASTM E112 and/or an anisotropy index in a planar oriented surface of at least 1.5 according to ASTM E112
and at least a second metallic member (11), wherein
the first metallic member (10) is positioned in contact with the second metallic member so that said longitudinal direction (L10) of the elongated grains is positioned substantially within the weld plane,
the article is formed by linear friction welding.

DETAILED DESCRIPTION OF A PREFERRED EMBODIMENT

The alloys are designated in compliance with the rules of The Aluminium Association (AA), known to the person skilled in the art. The definitions of metallurgical states are indicated in European standard EN 515.

Unless otherwise stipulated, the static mechanical characteristics, in other words the ultimate tensile strength UTS, the 0.2% offset tensile yield stress TYS and elongation at break E, are determined by a tensile test in accordance with standard EN ISO 6892-1; the sampling and the direction of the test being defined by standard EN 485-1. For welded assemblies, a gauge length of 30 mm is used to calculate TYS and E.

Fatigue tests were carried out according to ASTM E466-07 for test samples FPE 5A Kt 1.032 (flat samples with a thickness of 3 mm) under the following parameters: frequency of oscillations: f=50 Hz, oscillation maximal stress: $\sigma$=275 MPa, Ratio minimum/maximum stress: R=0.1, Maximal number of cycles allowed: N=1 000 000 cycles.

Figure 1:
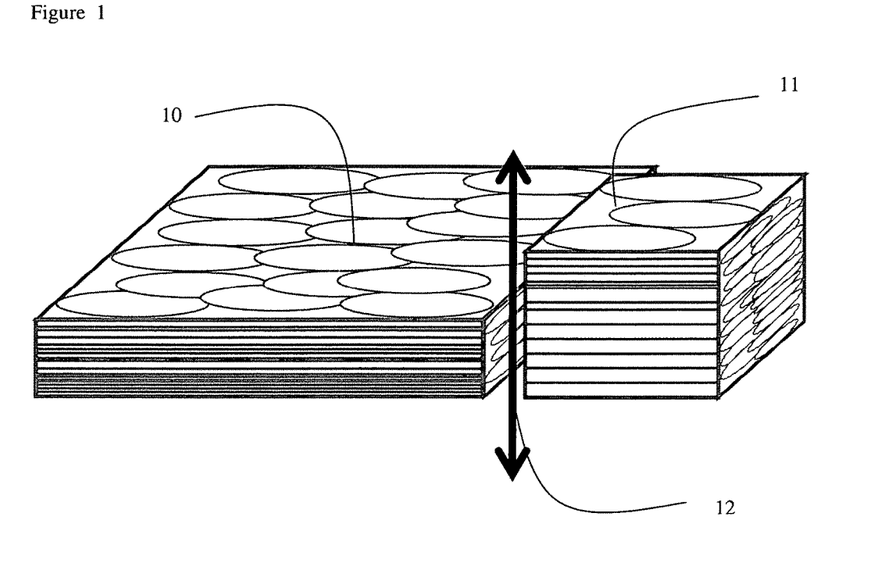
FIG. 1 is a general diagram describing the linear friction welding process.

FIG. 1 describes a linear friction welding operation. Two members (10) and (11) are placed side by side. One member is placed into oscillatory motion along the oscillation direction and then the two members are brought to contact. Member (10), which is for example the forge member, is fixed whereas member (11), which is then the oscillating member, is oscillating along the oscillating direction (12).

The normal force is increased progressively to a set friction pressure, the frequency and amplitude of oscillations being also set. The soft material layer is no longer able to support the normal force and is extruded into the "flash". The material at the interface is no longer under sliding friction in this phase.

The oscillatory motion is reduced after a desired parameter has been reached: burn-off (LFW parameter for axial shortening limit value in mm), absolute position in mm, time in s, or a combination of these three. The two components are aligned, the normal force increases up to the value of the forge pressure parameter. This phase is called the deceleration phase. Finally the forge phase allows the resultant joint to cool down whilst an axial compressive force, the forging pressure, is maintained.

For a given metal alloy, in a given metallurgical temper, welding parameters may be optimized to obtain a weld whose visual quality is satisfactory and whose mechanical strength and/or elongation is maximized while using the fastest welding speed possible. The welding parameters are essentially defined by the oscillation amplitude and frequency, the friction pressure, the forge pressure and the burn-off (mm).

The invention concerns linear friction welding of at least a first metallic member (10) in the form of an aluminum alloy wrought product having elongated grains in a longitudinal direction (L10), with an anisotropy index in a longitudinal oriented surface of at least 4 according to ASTM E112 and/or an anisotropy index in a planar oriented surface of at least 1.5 according to ASTM E112 and at least a second metallic member (11).

Figure 2:
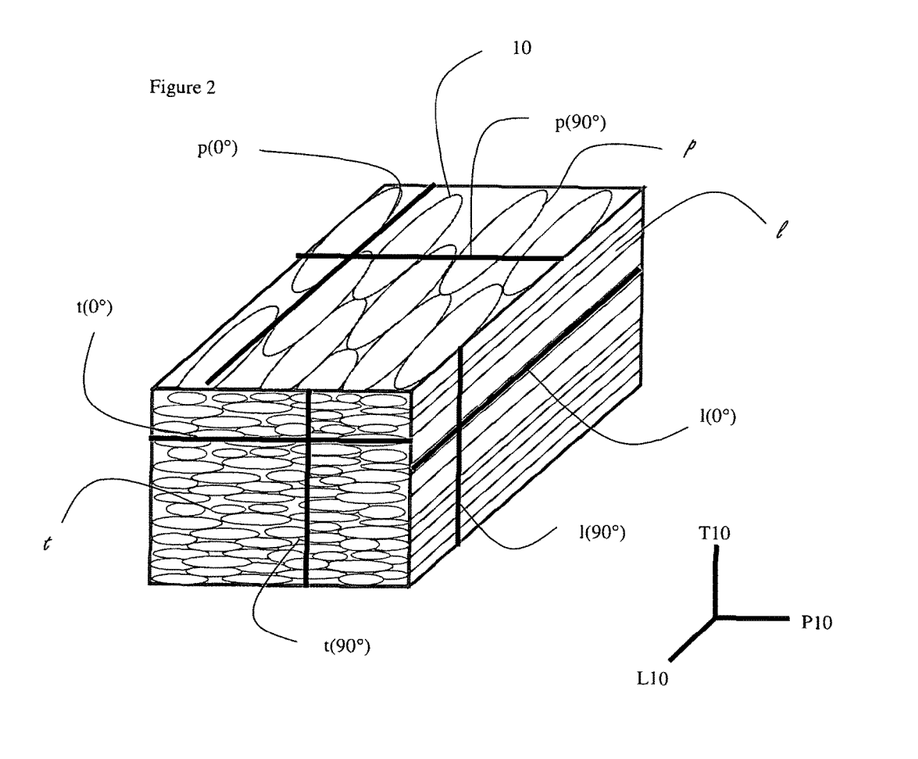
FIG. 2 illustrates the notation according to ASTM E112 used to define grain orientations

FIG. 2 shows the grain orientation of the aluminum alloy wrought member (10), with symbols in accordance to FIG. 7 of standard ASTM E112. The longitudinal direction of the grains is along test line l(0°) for the longitudinal oriented surface *l* or p(0°) for the planar oriented surface *p* . The transverse direction of the grains is along test line l(90°) for the longitudinal oriented surface *l* or t(90°) for the transverse oriented surface *t* . The planar direction of the grains is along test line t(0°) for the transverse oriented surface *t* or p(90°) for the planar oriented surface *p* . For convenience in the present application the longitudinal direction of the grains l(0°), p(0°) is also referred to as L, the transverse direction l(90°), t(90°) is also referred to as T and the planar direction t(0°), p(90°) is also referred to as P, with additional numbers to represent the considered member. For example L10 is the longitudinal direction of the first member (10).

Typically, the aluminium alloy wrought product is a rolled, forged or extruded product that has been sufficiently worked to obtain elongated grains with an anisotropy index in a longitudinal oriented surface of at least 4 according to ASTM E112 and/or an anisotropy index in a planar oriented surface of at least 1.5 according to ASTM E112. Preferably, the anisotropy index in the longitudinal oriented surface is of at least 6 or even at least 8 according to ASTM E112 and/or the anisotropy index in the planar oriented surface is at least 2 or even at least 4 according to ASTM E112.

The present inventors have found that by using specific grain orientation during LFW it is possible to significantly improve the mechanical properties of the weld. Usually, metallic members are welded with the longitudinal direction of the elongated grains substantially perpendicular to the weld plane because the mechanical properties of the members are higher in the longitudinal direction and it is expected to be beneficial to load a welded article along this direction.

Figure 4:
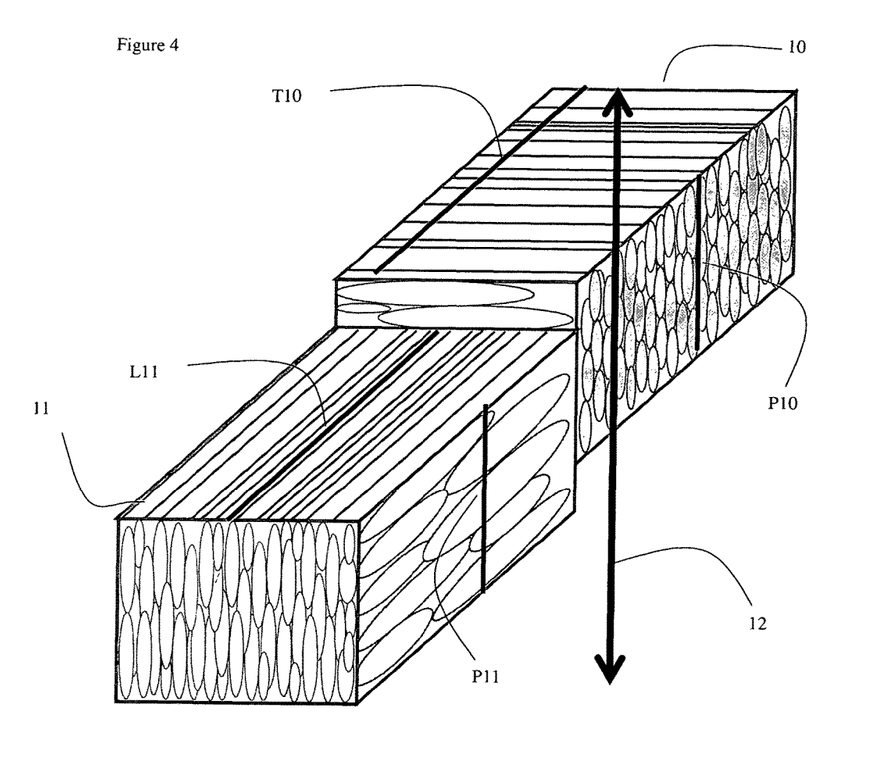
FIG. 4 illustrates an embodiment of the invention

According to the present invention an improved weld performance is obtained when the longitudinal direction of the elongated grains (L10) of at least the first metallic member (10) is positioned substantially within the weld plane, as shown for example in FIG. 4. Surprisingly, the most classical grain orientation during LFW for which the direction of the elongated grains is substantially perpendicular to the weld plane provides lower strength and/or elongation than the present invention. By substantially it is meant within the present invention that a difference of a few degrees, typically less than 10 degrees or even less than 5 degrees compared to the strictly "within" or "perpendicular" conditions does not significantly affect the results.

Even more advantageous elongation is obtained in an embodiment where the transverse direction of the grains (T10) of said first metallic member (10) is substantially perpendicular to the weld plane with preferentially the oscillating direction substantially parallel to the planar direction of the grains (P10) of said first metallic member (10). It may be advantageous in another embodiment to have the transverse direction of the grains, (T10) of said first metallic member substantially within the weld plane, in order to obtain an improved combination of strength and fatigue. Advantageously said first metallic member (10) is the forge member and said second metallic member (11) is the oscillating member.

In an embodiment of the present invention, which is referred to for convenience as "welding before aging" embodiment, said first metallic member is linear friction welded in a temper that is not artificially aged, typically a T3 or T4 temper, and a post-weld heat treatment, is then carried out. The post-weld heat treatment may include solution heat treatment and/or quenching and/or aging. Preferably, the post-weld heat treatment is an aging treatment carried out at a temperature between 120° C. and 180° C. during 10 to 80 hours. The welded article is typically put in a furnace in order to carry out the post-weld heat treatment. It is advantageous in a first "welding before aging" embodiment that said second metallic member (11) is in the form of an aluminium alloy wrought product, in a temper that is not artificially aged, having elongated grains in a longitudinal direction (L11) with an anisotropy index in a longitudinal oriented surface of at least 4 according to ASTM E112 and/or an anisotropy index in a planar oriented surface of at least 1.5 according to ASTM E112 and wherein the longitudinal direction (L11) of the elongated grains of said second metallic member (11) is positioned substantially perpendicular the weld plane. Preferentially in this first "welding before aging" embodiment the oscillating direction is substantially parallel to the planar direction of the grains (P11) of said second metallic member (11). This first "welding before aging" embodiment may be illustrated for example by FIG. 4.

Figure 5:
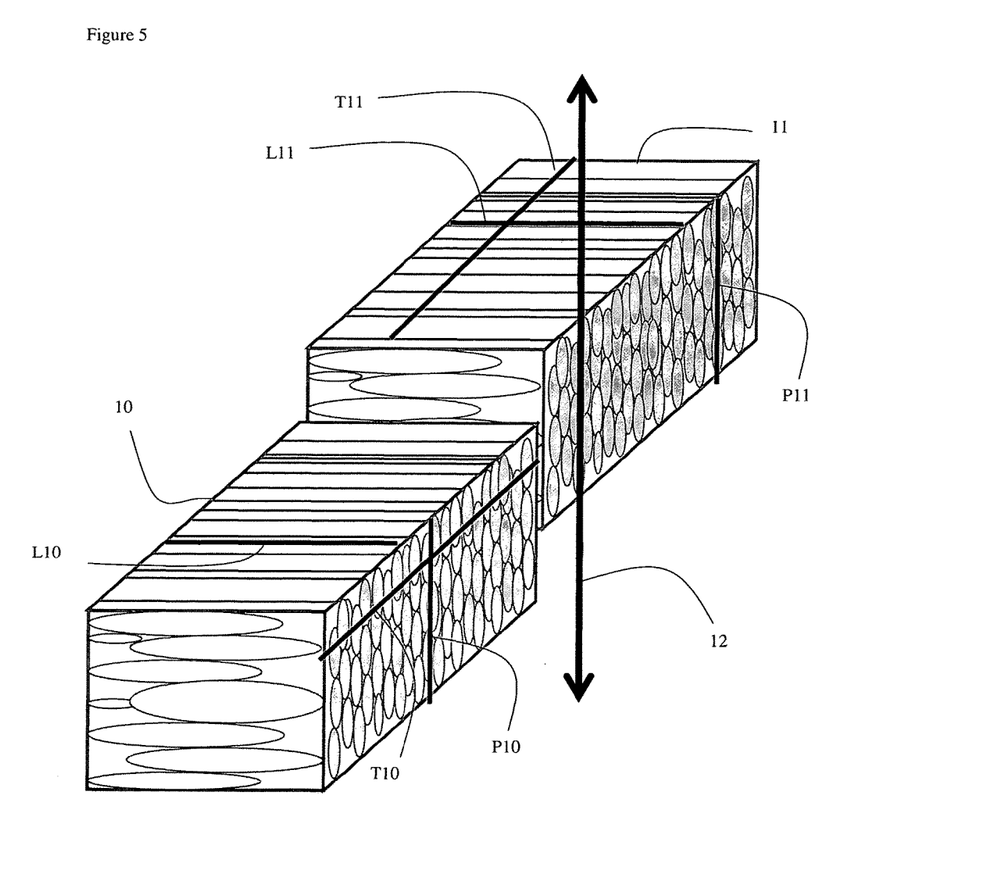
FIG. 5 illustrates an embodiment of the invention

It is advantageous in a second "welding before aging" embodiment that said second metallic member (11) is in the form of an aluminium alloy wrought product, in a temper that is not artificially aged, having elongated grains in a longitudinal direction (L11) with an anisotropy index in a longitudinal oriented surface of at least 4 according to ASTM E112 and/or an anisotropy index in a planar oriented surface of at least 1.5 according to ASTM E112 and wherein the longitudinal direction (L11) of the elongated grains of said second metallic member (11) is positioned substantially within the weld plane and wherein the transverse direction of the grains (T11) of said second metallic member (11) is substantially perpendicular to the weld plane. Preferentially in this second "welding before aging" embodiment the oscillating direction is substantially parallel to the planar direction of the grains (P11) of said second metallic member (11). This second "welding before aging" embodiment may be illustrated for example by FIG. 5. Preferably, the anisotropy index in the longitudinal oriented surface is of at least 6 or even at least 8 according to ASTM E112 and/or the anisotropy index in the planar oriented surface is at least 2 or even at least 4 according to ASTM E112.

It should be noted that in the "welding before aging" embodiment the joint efficiency is particularly high. If the joint efficiency is defined for convenience as the ratio of ultimate tensile strength of the welded article to the ultimate tensile strength in the L direction of initial member, the joint efficiency in the "welding before aging" embodiment is at least 90% and preferably at least 92%.

In another embodiment of the present invention, which is referred to for convenience "welding after aging" said first metallic member is in a final metallurgical temper, typically T6, T7X or T8, before welding. Final metallurgical temper refers to the metallurgical temper that is used in the final product and is not modified by a further aging treatment. Typically a final metallurgical temper for an aluminium alloy containing Li is a T8 temper, for a 7XXX series alloys it is typically a T6 or a T7X temper, for a 2XXX series alloy which does not contain Li it may also be a T3 or T4 temper.

It is advantageous in the "welding after aging" embodiment that said second metallic member (11) is in the form of an aluminium alloy wrought product, in a final metallurgical temper, having elongated grains in a longitudinal direction (L11), with an anisotropy index in a longitudinal oriented surface of at least 4 according to ASTM E112 and/or an anisotropy index in a planar oriented surface of at least 1.5 according to ASTM E112 and wherein said longitudinal direction of the elongated grains of said second metallic member is positioned substantially within the weld plane. Advantageously in the "welding after aging" embodiment the transverse direction of the grains (T11) of said second metallic member is substantially perpendicular to the weld plane and preferably the oscillating direction is substantially parallel to the planar direction of the grains (P11) of said second metallic member.

In another embodiment of "welding after aging" embodiment, which may in some instances the fatigue performance, the transverse direction of the grains (T11) of said second metallic member is substantially within the weld plane.

This invention allows members made of dissimilar metal alloys to be welded. This may concern, for example, two aluminum alloys whose yield stress is different, or an aluminum alloy and another metal such as a titanium alloy, steel, a copper alloy or a nickel based alloy. Particularly advantageous properties are obtained when the first metallic member and the second metallic member are made of aluminum alloys.

Among aluminum alloys the invention is advantageous in particular for the alloys of the 2XXX, 3XXX, 5XXX, 6XXX, 7XXX and 8XXX families. The invention is particularly advantageous for linear friction welding of members made of aluminum-lithium type aluminum alloy, i.e. containing at least about 0.5% lithium by weight.

Within the scope of this invention, 2XXX alloy members selected from the group AA2X39, AA2X24, AA2X50, AA2X55, AA2X60, AA2X76, AA2X95, AA2X96, AA2X98, AA2X99, are particularly advantageous and 7XXX alloy members selected from the group AA7X10, AA7X40, AA7X49, AA7X50, AA 7X75, AA7X81, AA7X85, AA7X99 are particularly advantageous.

The invention method is particularly advantageous to manufacture structural articles, particularly for automobiles or aircrafts. "Structural article" of a mechanical construction here refers to a mechanical part for which the static and/or dynamic mechanical properties are particularly important for the performance of the structure, and for which a structural analysis is usually prescribed or performed. These are typically articles the failure of which is likely to endanger the safety of said construction, its users or others. For an aircraft, these structural articles include the parts which make up the fuselage (such as the fuselage skin, stringers, bulkheads, circumferential frames), the wings (such as the upper or lower wing skin, stringers or stiffeners, ribs and spars) and the tail unit, made up of horizontal and vertical stabilizers, as well as floor beams, seat tracks and doors. The invention method is particularly suited for the manufacture of ribs.

Example 1

Articles made by linear friction welding of AA2050 rolled members in a T8 temper have been prepared. This example illustrates the "welding after aging" embodiment. The AA2050 members were 75×40×25 mm coupons cut from a plate. The AA2050 members had elongated grains in a longitudinal direction with an anisotropy index in a longitudinal oriented surface of 8.75 according to ASTM E112 and an anisotropy index in a planar oriented surface of 2.5 according to ASTM E112. Grain orientation references are conform to ASTM E112 FIG. 7 and are represented in FIG. 2. The coupons were linear friction welded by contacting the 40×25 mm sections, the oscillating direction was the direction of the 25 mm dimension. The mechanical properties of the AA2050 T8 plate are provided in Table 1.

TABLE 1

Mechanical properties of the AA2050 plate in T8 temper used for welding

| Direction | TYS (MPa) | UTS (MPa) | Elongation (%) |
|---|---|---|---|
| L | 514 | 544 | 11.4 |
| LT | 480 | 528 | 8.2 |
| ST | 450 | 523 | 3.9 |

Figure 3:
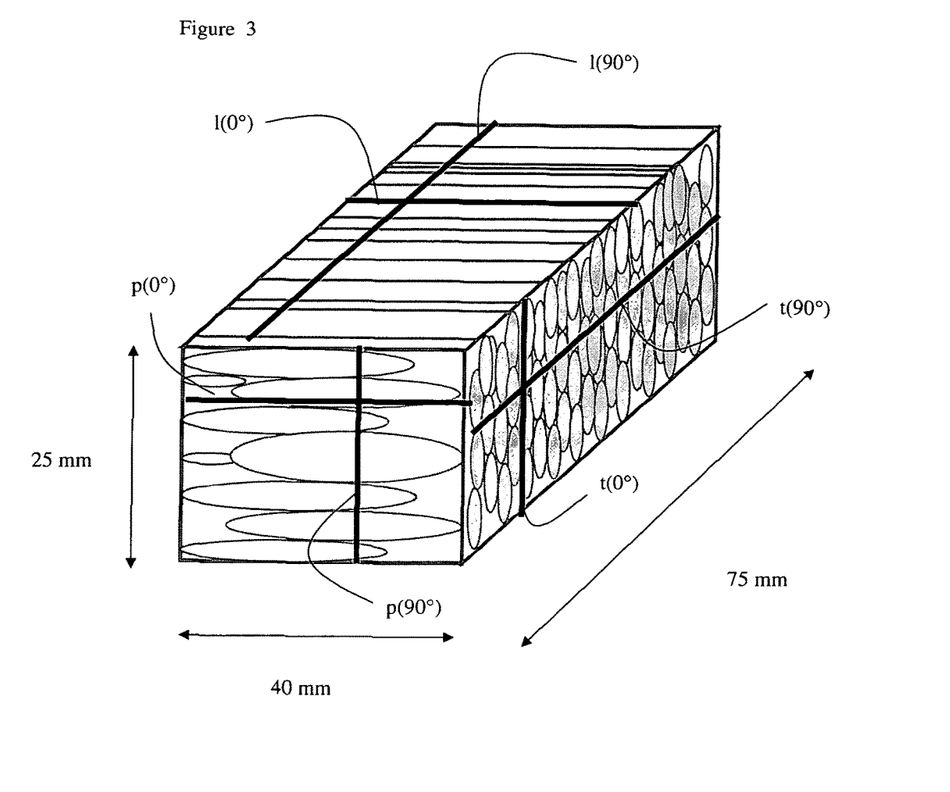
FIG. 3 illustrates the notation used for the examples.

The orientation of the various test samples is provided in Tables 2a and 2b. As an example the forge part coupon of test samples 5 and 6 is presented FIG. 3 which shows the direction of the 25 mm, 45 mm and 75 mm dimensions. The configuration of test samples 5 and 6 is presented in FIG. 5. Test samples 1 and 2 are reference test samples and test samples 3 to 9 are according to the invention.

TABLE 2a

Grain orientation of the forge member

| | | | section | | | | | |
|---|---|---|---|---|---|---|---|---|
| | | | 75 × 25 | | 40 × 25 | | 75 × 40 | |
| Longitudinal | Transverse | | | | Dimension | | | |
| direction vs weld plane | direction vs weld plane | Test sample | 75 mm | 25 mm | 40 mm | 25 mm | 75 mm | 40 mm |
| Perpendicular | Within | 1 | l(0°) | l(90°) | t(0°) | t(90°) | p(0°) | p(90°) |
| Perpendicular | Within | 2 | l(0°) | l(90°) | t(0°) | t(90°) | p(0°) | p(90°) |
| Within | Within | 3 | p(90°) | p(0°) | l(90°) | l(0°) | t(0°) | t(90°) |
| Within | Within | 4 | p(90°) | p(0°) | l(90°) | l(0°) | t(0°) | t(90°) |
| Within | Perpendicular | 5 | t(90°) | t(0°) | p(0°) | p(90°) | l(90°) | l(0°) |
| Within | Perpendicular | 6 | t(90°) | t(0°) | p(0°) | p(90°) | l(90°) | l(0°) |
| Perpendicular | Within | 7 | l(0°) | l(90°) | t(0°) | t(90°) | p(0°) | p(90°) |
| Within | Perpendicular | 8 | t(90°) | t(0°) | p(0°) | p(90°) | l(90°) | l(0°) |
| Within | Within | 9 | p(90°) | p(0°) | l(90°) | l(0°) | t(0°) | t(90°) |

TABLE 2b

Grain orientation of the oscillating member

| | | | section | | | | | |
|---|---|---|---|---|---|---|---|---|
| | | | 75 × 25 | | 40 × 25 | | 75 × 40 | |
| Longitudinal | Transverse | | | | Dimension | | | |
| direction vs weld plane | direction vs weld plane | Test sample | 75 mm | 25 mm | 40 mm | 25 mm | 75 mm | 40 mm |
| Perpendicular | Within | 1 | l(0°) | l(90°) | t(0°) | t(90°) | p(0°) | p(90°) |
| Perpendicular | Within | 2 | l(0°) | l(90°) | t(0°) | t(90°) | p(0°) | p(90°) |
| Within | Within | 3 | p(90°) | p(0°) | l(90°) | l(0°) | t(0°) | t(90°) |
| Within | Within | 4 | p(90°) | p(0°) | l(90°) | l(0°) | t(0°) | t(90°) |
| Within | Perpendicular | 5 | t(90°) | t(0°) | p(0°) | p(90°) | l(90°) | l(0°) |
| Within | Perpendicular | 6 | t(90°) | t(0°) | p(0°) | p(90°) | l(90°) | l(0°) |
| Within | Perpendicular | 7 | t(90°) | t(0°) | p(0°) | p(90°) | l(90°) | l(0°) |
| Within | Within | 8 | p(90°) | p(0°) | l(90°) | l(0°) | t(0°) | t(90°) |
| Perpendicular | Within | 9 | l(0°) | l(90°) | t(0°) | t(90°) | p(0°) | p(90°) |

Welding was realized on a E20 machine manufacture by Thomson friction welding. The welding conditions are provided in Table 3. The burn-off was 2.5 mm for all the samples.

TABLE 3

Experimental linear friction welding parameters

| Test sample | Frequency of oscillations (Hz) | Amplitude of oscillations (mm) | Friction pressure (MPa) | Forge pressure (MPa) |
|---|---|---|---|---|
| 1 | 50 | 3 | 120 | 120 |
| 2 | 40 | 2 | 150 | 150 |
| 3 | 40 | 2 | 150 | 150 |
| 4 | 50 | 3 | 120 | 120 |
| 5 | 40 | 2 | 150 | 150 |
| 6 | 50 | 3 | 120 | 120 |
| 7 | 40 | 2 | 150 | 150 |
| 8 | 40 | 2 | 150 | 150 |
| 9 | 40 | 2 | 150 | 150 |

The results of the tensile tests of the welded articles ($L_0$=30 mm) and of the fatigue tests are provided in Table 4. The balance between ultimate tensile strength ($R_m$) and elongation is presented in FIG. 6.

TABLE 4

Mechanical testing of the welded samples.

| Test sample | TYS (MPa) | UTS (MPa) | Elongation (%) | Fatigue (number of cycles) |
|---|---|---|---|---|
| 1 | 320 | 410 | 3.2 | 1376690 |
| 2 | 342 | 413 | 2.8 | 138559 |
| 3 | 344 | 424 | 2.6 | 866535 |
| 4 | 322 | 419 | 3.1 | 149011 |
| 5 | 317 | 412 | 5.3 | 65780 |
| 6 | 315 | 418 | 4.6 | 111675 |
| 7 | 329 | 417 | 3.1 | 1246291 |
| 8 | 330 | 418 | 3.5 | 110444 |
| 9 | 329 | 415 | 3.8 | 128592 |

Figure 6:
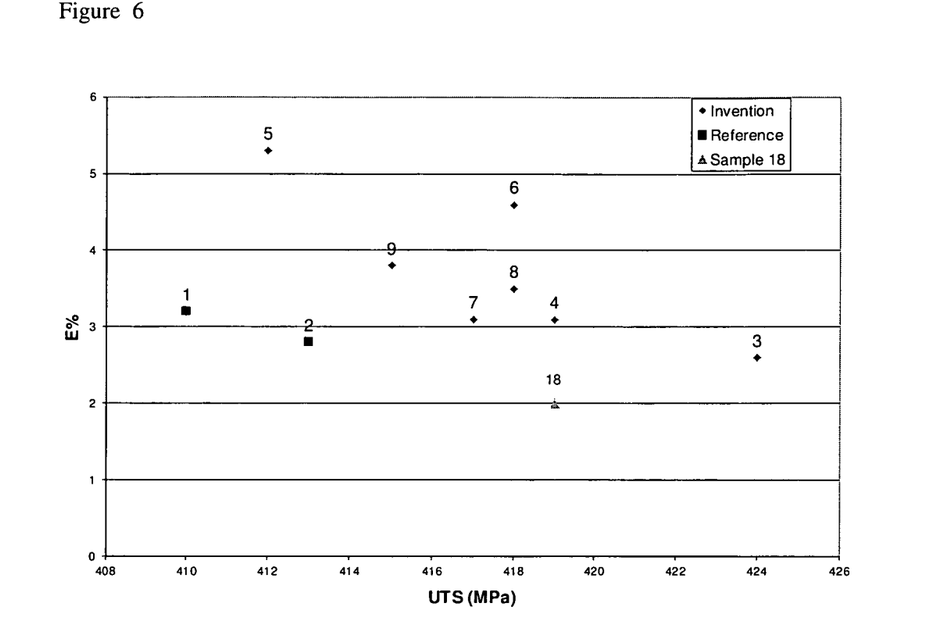
FIG. 6 illustrates the balance between strength and elongation for example 1.

FIG. 6 shows that all the test samples according to the invention, having the longitudinal direction of the elongated grains for the forge member or the oscillating member positioned within the weld plane, exhibit a better balance of strength and elongation than examples 1 and 2 which do not have this feature. FIG. 6 also shows that test samples 5 and 6 which have the transverse direction of the grains, l(90°), t(90°) perpendicular to the weld plane for the forge member and the oscillating member, and have been welded with two different sets of linear friction welding process conditions, exhibit the best balance between strength and elongation. It is noted however that test sample 3 which has the transverse direction of the grains, l(90°), t(90°) substantially within the weld plane for the forge member and the oscillating member exhibits high strength and high fatigue performance.

Example 2

Articles made by linear friction welding of AA2050 rolled members in a T3 temper have been prepared. This example illustrates the "welding before aging" embodiment. The AA2050 members were 75×40×25 mm coupons cut into a plate. The AA2050 members had elongated grains similar to those of the AA2050 T8 members of example 1. The coupons were linear friction welded by contacting the 40×25 mm sections, the oscillating direction was the direction of the 25 mm dimension. Following the welding operation, a post-weld heat treatment of 18 hours at 155° C. was carried out.

The orientation of the various test samples is provided in Tables 5a and 5b.

Test sample 10 is a reference test sample and test samples 11 to 17 are according to the invention.

Figure 7:
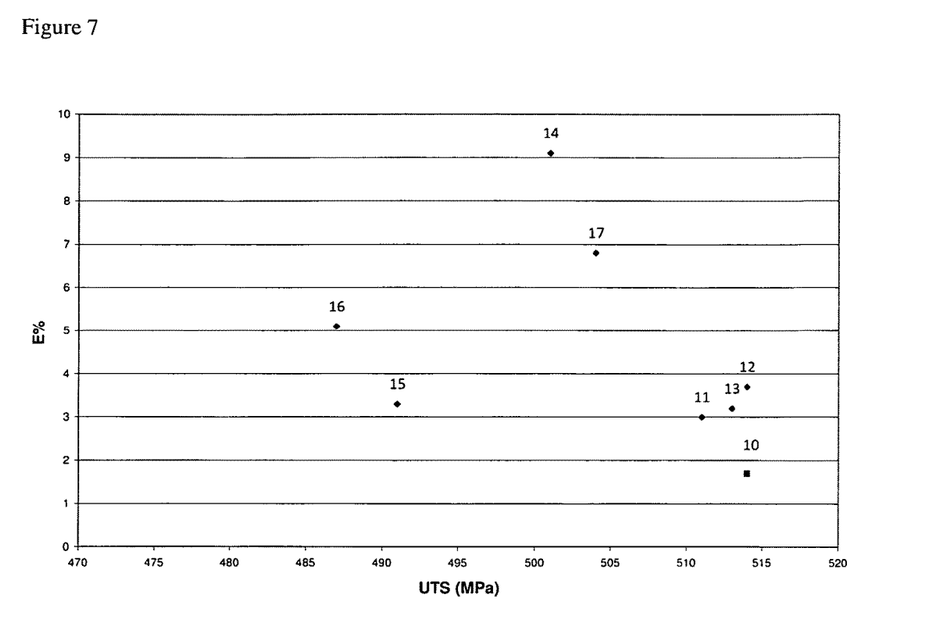
FIG. 7 illustrates the balance between strength and elongation for example 2.

The balance between ultimate tensile strength ($R_m$) and elongation is presented in FIG. 7.

TABLE 6

Mechanical testing of the welded samples.

| Test sample | TYS (MPa) | UTS (MPa) | Joint efficiency | Elongation (%) | Fatigue (number of cycles) |
|---|---|---|---|---|---|
| 10 | 478 | 514 | 94% | 1.7 | 193735 |
| 11 | 462 | 511 | 94% | 3.0 | 55608 |
| 12 | 463 | 514 | 94% | 3.7 | 102722 |
| 13 | 467 | 513 | 94% | 3.2 | 390041 |
| 14 | 459 | 501 | 92% | 9.1 | 143941 |
| 15 | 442 | 491 | 90% | 3.3 | 127486 |
| 16 | 432 | 487 | 90% | 5.1 | 65802 |
| 17 | 448 | 504 | 93% | 6.8 | 192954 |

Invention test samples exhibit significantly improved elongation compared to the reference test sample.

Very high elongation is obtained for test sample 14, wherein the longitudinal direction of the elongated grains of TABLE 5a Grain orientation of the forge member

| Longitudinal direction vs weld plane | Transverse direction vs weld plane | Test sample | 75 × 25 Section 75 mm | 75 × 25 Section 25 mm | 40 × 25 Section 40 mm | 40 × 25 Section 25 mm | 75 × 40 Section 75 mm | 75 × 40 Section 40 mm |
|---|---|---|---|---|---|---|---|---|
| Perpendicular | Within | 10 | l(0°) | l(90°) | t(0°) | t(90°) | p(0°) | p(90°) |
| Within | Perpendicular | 11 | l(90°) | l(0°) | p(90°) | p(0°) | t(90°) | t(0°) |
| Within | Perpendicular | 12 | l(90°) | l(0°) | p(90°) | p(0°) | t(90°) | t(0°) |
| Within | Perpendicular | 13 | l(90°) | l(0°) | p(90°) | p(0°) | t(90°) | t(0°) |
| Within | Perpendicular | 14 | t(90°) | t(0°) | p(0°) | p(90°) | l(90°) | l(0°) |
| Within | Perpendicular | 15 | l(90°) | l(0°) | p(90°) | p(0°) | t(90°) | t(0°) |
| Within | Perpendicular | 16 | l(90°) | l(0°) | p(90°) | p(0°) | t(90°) | t(0°) |
| Within | Perpendicular | 17 | t(90°) | t(0°) | p(0°) | p(90°) | l(90°) | l(0°) |

TABLE 5b

Grain orientation of the oscillating member

| Longitudinal direction vs weld plane | Transverse direction vs weld plane | Test sample | 75 × 25 Section 75 mm | 75 × 25 Section 25 mm | 40 × 25 Section 40 mm | 40 × 25 Section 25 mm | 75 × 40 Section 75 mm | 75 × 40 Section 40 mm |
|---|---|---|---|---|---|---|---|---|
| Perpendicular | Within | 10 | l(0°) | l(90°) | t(0°) | t(90°) | p(0°) | p(90°) |
| Perpendicular | Within | 11 | l(0°) | l(90°) | t(0°) | t(90°) | p(0°) | p(90°) |
| Perpendicular | Within | 12 | l(0°) | l(90°) | t(0°) | t(90°) | p(0°) | p(90°) |
| Perpendicular | Within | 13 | p(0°) | p(90°) | t(90°) | t(0°) | l(0°) | l(90°) |
| Perpendicular | Within | 14 | p(0°) | p(90°) | t(90°) | t(0°) | l(0°) | l(90°) |
| Within | Within | 15 | t(0°) | t(90°) | l(0°) | l(90°) | p(0°) | p(90°) |
| Within | Perpendicular | 16 | l(90°) | l(0°) | p(90°) | p(0°) | t(90°) | t(0°) |
| Within | Perpendicular | 17 | t(90°) | t(0°) | p(0°) | p(90°) | l(90°) | l(0°) |

Welding was realized on a E20 machine manufacture by Thomson friction welding. The welding conditions were the same as those of references 1, 4 and 6 of example 1, except that for sample 17, burn-off was 1 mm.

The results of the tensile tests of the welded articles ($L_0$=30 mm) and of the fatigue tests are provided in Table 6.

the forge member is within the weld plane and the longitudinal direction of the elongated grains of the oscillating member is perpendicular to the weld plane. Test sample 17 also exhibit a significantly improved balance between strength and elongation Fatigue results for invention test samples are usually similar and sometimes higher than fatigue results of the reference sample.

Example 3

Articles made by linear friction welding of AA2050 rolled members in a T8 temper have been prepared. This example illustrates the specific technical effect of anisotropy indexes. The AA2050 members were 75×40×25 mm coupons cut from a plate. The AA2050 members had an ultimate tensile strength of 523 MPa and a departure from an equiaxed shape which was not severe. The coupons were linear friction welded by contacting the 40×25 mm sections, the oscillating direction was the direction of the 25 mm dimension.

Welding was realized on a E20 machine manufacture by Thomson friction welding. The welding conditions were the same as those of references 1, 4 and 6 of example 1.

The results of the tensile tests of the welded articles ($L_0$=30 mm) and of the fatigue tests are provided in Table 7. The balance between ultimate tensile strength ($R_m$) and elongation is presented in FIG. 6 (sample 18).

TABLE 7

Mechanical testing of the welded samples.

| Test sample | TYS (MPa) | UTS (MPa) | Joint efficiency | Elongation (%) |
|---|---|---|---|---|
| 18 | 334 | 419 | 80% | 2 |

Invention test samples exhibit significantly improved elongation so as a better balance between strength and elongation compared to the test sample 18.

The invention claimed is:

1. A method for forming by welding along a flat surface of an article comprising
   at least a first metallic member in the form of an aluminium alloy wrought product having elongated grains in a longitudinal direction (L10), with an anisotropy index in a longitudinal oriented surface of at least 4 according to ASTM E112 and/or an anisotropy index in a planar oriented surface of at least 1.5 according to ASTM E112, wherein said first metallic member is in a final metallurgical temper chosen from T7X or T8 before welding, and
   at least a second metallic member in the form of an aluminum alloy wrought product, in a final metallurgical temper, having elongated grains in a longitudinal direction (L11), with an anisotropy index in a longitudinal oriented surface of at least 4 according to ASTM E112 and/or an anisotropy index in a planar oriented surface of at least 1.5 according to ASTM E112, wherein
   the first metallic member is positioned in contact with the second metallic member so that said longitudinal direction (L10) of the elongated grains is positioned substantially within the weld plane, and wherein the transverse direction (T10) of the grains of said first metallic member is substantially perpendicular to the weld plane,
   wherein said longitudinal direction of the elongated grains (L11) of said second metallic member is positioned substantially within the weld plane, and
   the article is formed by linear friction welding.

2. A method according to claim 1 wherein the oscillating direction is substantially parallel to the planar direction of the grains (P10) of said first metallic member.

3. A method according to claim 1 wherein said first metallic member is a forge member and wherein said second metallic member is an oscillating member.

4. A method according to claim 1 wherein the transverse direction of the grains (T11) of said second metallic member is substantially perpendicular to the weld plane.

5. A method according to claim 1 wherein the oscillating direction is substantially parallel to the planar direction of the grains (P11) of said second metallic member.

6. A method according to claim 1 wherein said first metallic member and optionally said second metallic member are made of an aluminum-lithium type aluminum alloy.

7. A method according to claim 1 wherein said article is a structural article of an aircraft or of an automobile, optionally an aircraft rib.

8. A method according to claim 1, wherein the transverse direction of the grains (T11) of said second metallic member is substantially within the weld plane.

9. The method according to claim 1, wherein the first metallic member has an anisotropy index in a longitudinal oriented surface of at least 6 according to ASTM E112 and/or an anisotropy index in a planar oriented surface of at least 2 according to ASTM E112.

10. The method according to claim 1, wherein the first metallic member has an anisotropy index in a longitudinal oriented surface of at least 8 according to ASTM E112 and/or an anisotropy index in a planar oriented surface of at least 4 according to ASTM E112.

11. The method according to claim 1, wherein said first metallic member is in a final metallurgical temper T7X before welding.

12. The method according to claim 1, wherein said first metallic member is in a final metallurgical temper T8 before welding.

* * * * *